April 10, 1956  G. C. REISER  2,741,471
COIN CONTROLLED PRINTER SHUTTER
Filed Nov. 27, 1951  2 Sheets-Sheet 2
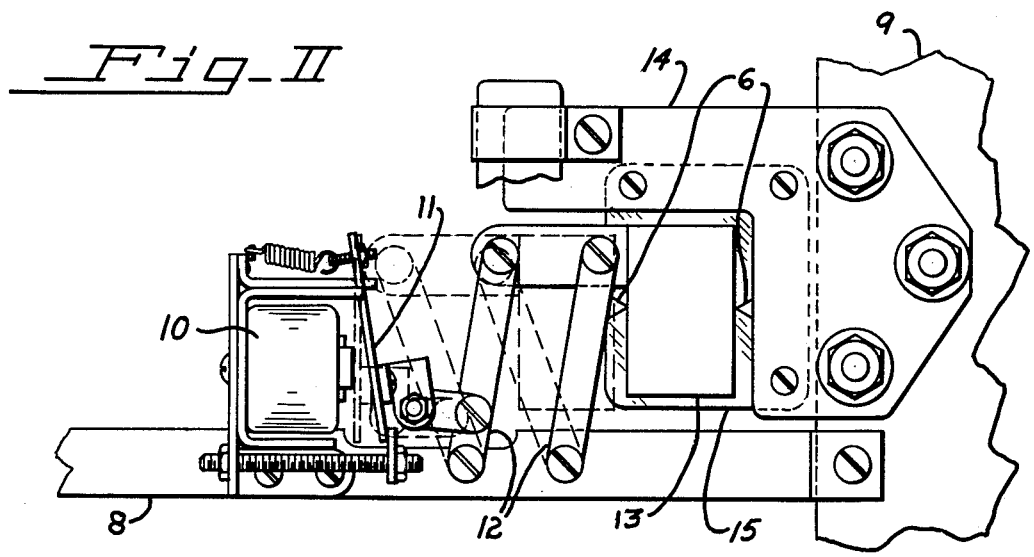
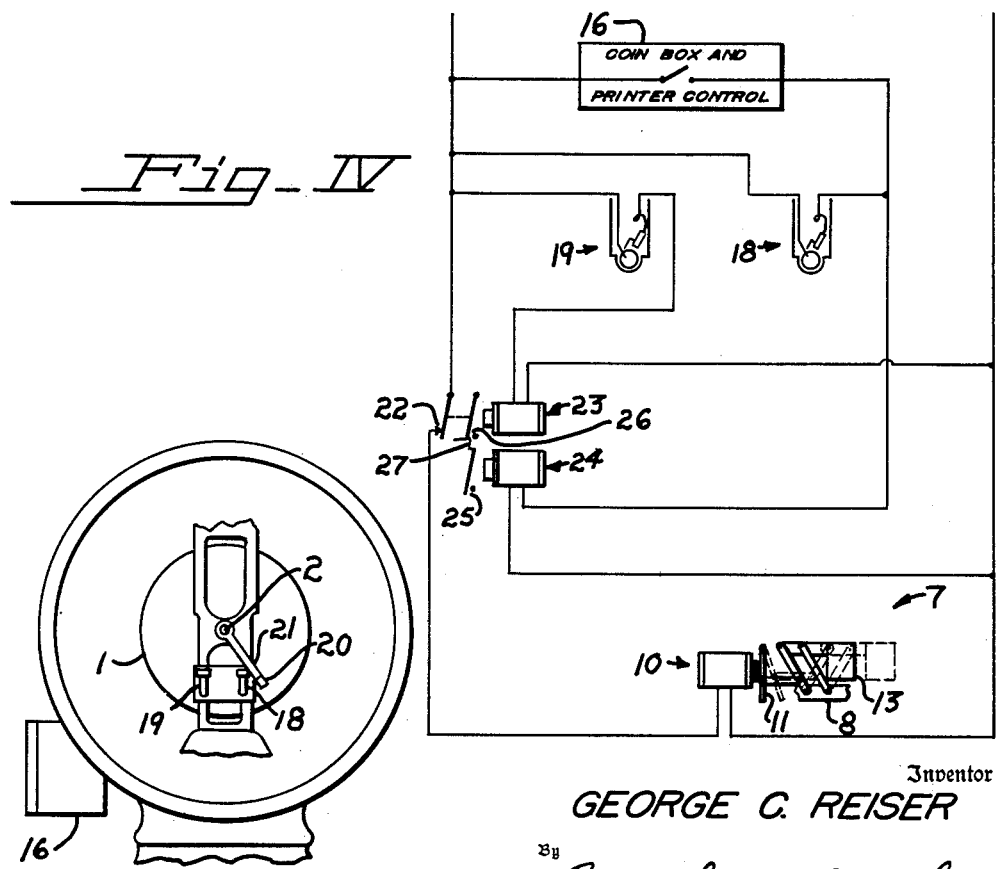
Inventor
GEORGE C. REISER
By Marshall & Marshall
Attorneys United States Patent Office 2,741,471
Patented Apr. 10, 1956

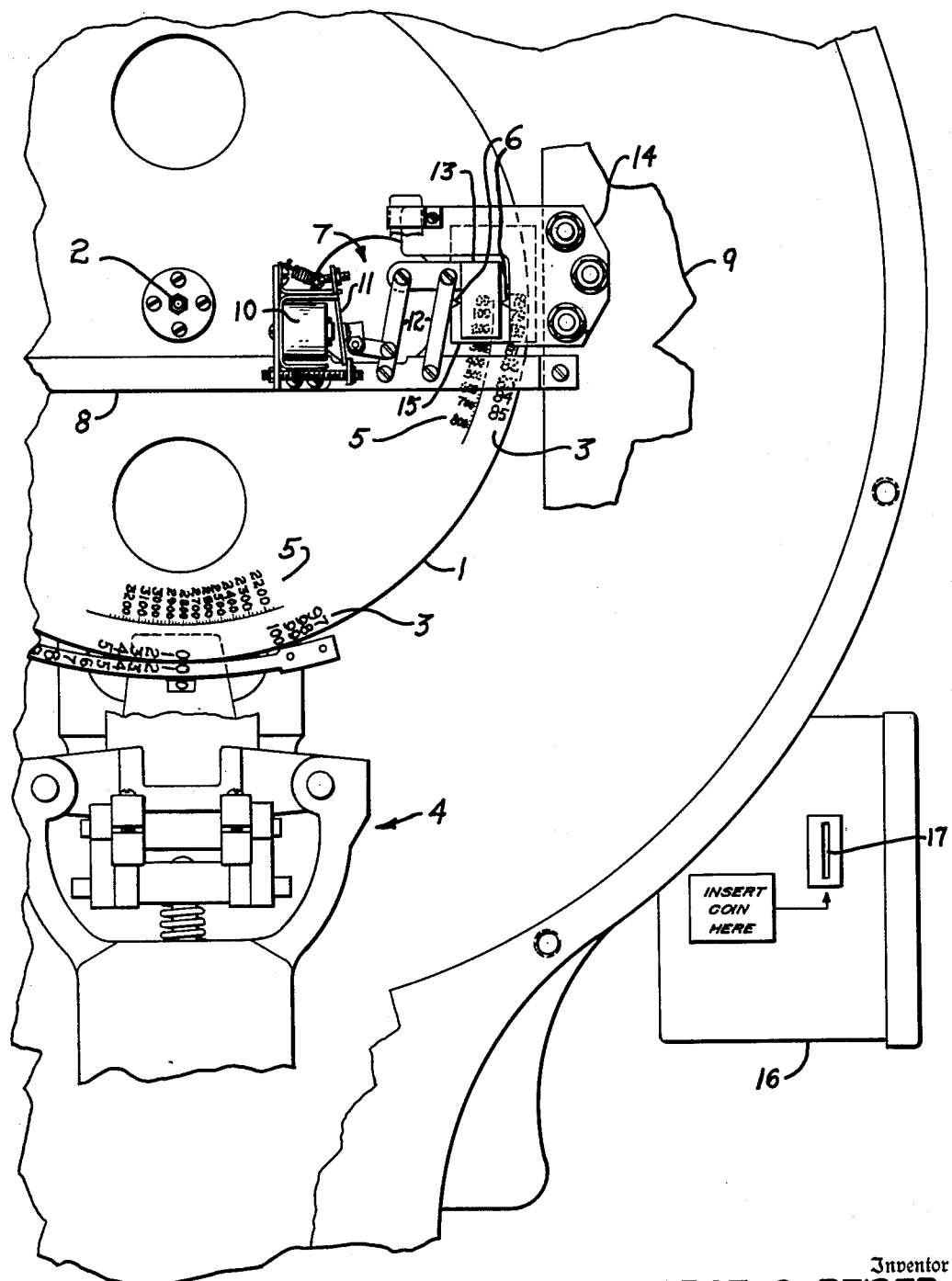

2,741,471

COIN CONTROLLED PRINTER SHUTTER

George C. Reiser, Toledo, Ohio, assignor to Toledo Scale Company, Toledo, Ohio, a corporation of New Jersey Application November 27, 1951, Serial No. 258,400

4 Claims. (Cl. 265—5)

This invention relates to weighing scales and particularly to weighing scales with means selectively to conceal and reveal the indications of the weight of loads placed thereupon.

It is a principal object of this invention to permit viewing of weight indicia when there is no load on the scale to facilitate offsetting tare weights and then to obstruct from view the indications of the weights of articles as the articles are being placed upon scales until certain prescribed conditions are fulfilled, such as depositing a coin into a coin actuated mechanism operatively attached to the scale.

Another object is to provide a revenue producing truck weighing scale which can be operated on a twenty-four-hour-per-day basis and that does not require an attendant for its operation.

According to the invention, while a load is being placed upon and remains upon the scale, an electrically operated shutter is positioned to obscure from view any indication of the load's weight. When a coin is deposited in an associated coin actuated mechanism, the shutter is moved from its view obstructing position to expose the weight indication and a printing mechanism is set into operation to print the wight of the load on a suitable ticket or other recording means.

Further objects and advantages will be apparent from the following description in which reference is made to the accompanying drawings.

In the drawings:

Figure I is a fragmentary front elevational view of a scale embodying the invention, parts being broken away.

Figure II is an enlarged elevational view of the shutter mechanism employed in the invention.

Figure III is a simplified rear elevational view of the scale head, with the housing cover removed, showing only the scale operated means for controlling the shutter mechanism.

Figure IV is a schematic wiring diagram of the circuits employed in the preferred embodiment of the invention.

Referring to the drawings, a thin, indicia-bearing disk 1, mounted on a rotatable indicator shaft 2, is driven by a load counterbalancing mechanism of the scale to a position indicative of the load on the load receiver of the scale.

Located circumferentially on the face of the disk 1 at its outer edge is a series of raised printing characters 3 which cooperate with a printing mechanism 4 fully described in U. S. Patent No. 2,390,482, issued December 4, 1945, to Williams. Paralleling the raised printing characters 3 is a series of indicia 5 which cooperate with indexes 6 for visually indicating the weight of a load placed upon the scale.

A shutter assembly 7 is mounted on a horizontal cross bar 8 which is fastened at its ends to portions 9 of the scale framework. A solenoid 10, an armature 11, a pair of parallel links 12, and a shutter 13 comprise the shutter assembly 7, and are shown in Figure II in their obstructing and unobstructing or removed positions, the unobstructing position being shown by dotted lines.

The printing mechanism 4 and the shutter assembly 7 may be arranged in numerous positions along the paths of their respective printing characters and indicia providing the characters and indicia are angularly spaced accordingly. Hence the printed weight record and the visual weight indication will always be identical.

A window frame 14 is mounted on the scale frame 9. Fastened to the window frame 14 and lying between the shutter 13 and the disk 1 is a transparent glass or plastic window 15. For ideal indication, the window 15 should lie parallel to the face of the disk 1 and be as close to it as possible.

Mounted at the lower right side of the scale head is a coin box 16 having an opening 17 to receive coins.

Referring now to Figure III, the shutter control mechanism includes a pair of mercury magnetic switches 18 and 19 actuated by a magnet 20 mounted on an arm 21 projecting laterally from the indicator shaft 2. With an increase in load the shaft rotates clockwise as viewed from the rear of the scale. The arm 21 is arranged on the shaft 2 so that the magnet 20 actuates the mercury switches 18 and 19 at indicated loads of fifty and four hundred pounds respectively.

Referring to Figure IV, when the scale is at zero, with the switches 18 and 19 open, current flows through closed contacts 22 of a latch relay 23 to the shutter operating solenoid 10 to the opposite side of the line. When energized, the solenoid 10 attracts the armature 11 which, through links 12, draws and holds the shutter 13 in its nonobstructing position to expose the indicia 5 for balancing and tare offsetting operations.

As a load is applied to the scale, the magnet 20 on the indicator shaft arm 21 first momentarily operates the mercury magnetic switch 18, set at the fifty pounds load indication, to briefly energize a latch releasing coil 24 and operate a release coil armature 25. This has no further effect because the latch relay was already released. As the indicator further rotates, the magnet 20 next closes the mercury magnetic switch 19, set to operate when the indicator reaches the four hundred pounds indication. Current then flows to the closing coil of the latch relay 23 to attract its armature 26 and open the contacts 22. The opening of contacts 22 stops current flow through the shutter operating solenoid 10 thereby permitting the shutter 13 to close and conceal the indicia behind the window 15. As the magnet leaves the switch 19, the switch opens and the latch closing coil is de-energized. The contacts 22, however, remain open, the armature 26 being caught behind the latch 27 of the armature 25 of the latch releasing coil 24. Since the contacts 22 remain open, the shutter solenoid 10 remains de-energized and the shutter remains closed.

When the scale comes to rest with the load counter-balanced and it is desired to read the weight and make a printed record, a coin is dropped into the coin box 16. Coin controlled mechanism therein then briefly permits a flow of current to start the printing mechanism and to energize the latch releasing coil 24. Energization of the release coil 24 through its armature 25 unlatches the armature 26 to reclose the contacts 22 and thereby energize the shutter operating solenoid 10. The shutter 13 opens to expose the weight indication of the load.

When the load is removed from the scale platform, and the indicator returns to its zero position, switches 19 and 18 are closed successively by the magnet 20. This causes the shutter to close, and then to open again. This final closing and opening are of no consequence, however. When the scale is again at zero or no load, the shutter is open to allow for rebalancing and for offsetting the tare load for a subsequent weighing cycle.

Operation

In the operation of a truck-weighing scale, which is merely one adaptation of the instant invention, the truck driver stops before driving onto the scale platform. At this time with the shutter open, the driver checks the indication and, if necessary, moves the balancing poise of the scale until a zero indication is obtained. (Truck scale platforms vary in weight with the accumulation upon them of water, snow, gravel, etc., the weight of which must be offset if the scale is to give correct weight indications.)

If the tare weight of the truck is known, the driver may set the tare poise to offset the tare weight of the truck. If the tare weight of the truck is not known, the empty truck is driven upon the scale platform and the driver sets the tare poise to a position on its beam at which the scale is balanced and the visual weight indication is zero. The driver makes a note of the tare weight so that he can reposition the tare poise in case it is disturbed while the truck is being loaded.

The loaded truck then is driven onto the scale platform. As this is done, the indicator arm 21 on the indicator shaft 2 carries the magnet 20 past the magnetic switches 18 and 19 to close the shutter 13 thus to conceal the indication of the weight of the load. The driver, either before or after driving upon the scale platform, places an invoice into a proper slot in the scale to receive a printed record of the load's weight. After driving onto the platform, he places a coin in the slot 17 of the coin box 16 to initiate a printing cycle and either simultaneously with the operation of the printer or immediately afterwards cause the shutter 13 to move from its view obstructing position. The driver then has a printed record of the weight of his load which may be checked with a visual indication of the load's weight.

Finally, the truck is driven from the scale platform and the scale is ready for its next weighing operation.

Another form of the invention involves its use in truck-weighing scales designed to indicate the axle-load weight of trucks. With much emphasis being placed upon maximum axle loads allowed by certain State laws, many truck drivers wish to obtain a record of the weight of their truck's axle-loading. In this case the length of the scale platform is shortened to accommodate only one set of wheels at a time. The scale is operated in the same fashion as that mentioned previously with the exception that the tare offsetting operations are eliminated.

Various modifications in details of construction of the parts may be made without departing from the spirit and scope of the invention.

Having described the invention, I claim:

1. In a weighing scale, in combination, a frame, an indicator shaft mounted for rotation within the frame, a disk fixed to the indicator shaft and rotatable therewith, there being a series of indicia on a marginal area of the disk, a window supported by the frame adjacent the marginal area of the disk and viewing certain of the indicia, a shutter movable along a path a portion of which path is in open position away from the window and a portion of which path is in closed position in front of the window, driving means for moving the shutter along the path from closed position into open position and from open position into closed position, the shutter normally being in open position when no load is upon the weighing scale, an arm fixed to the indicator shaft and rotatable therewith for causing a closing of the shutter after, at least, a predetermined load is placed upon the scale, and circuit means for controlling the shutter driving means, said circuit means comprising a first relay that is controlled by the position of the arm and that permits current to flow to the shutter driving means to open the shutter when the arm is in any position between no load and the predetermined load position and that cuts off current flow to the shutter driving means to close the shutter when the arm has reached or passed the predetermined load position and a coin controlled second relay which upon deposition of a coin nevertheless permits current to flow to the shutter driving means again to open the shutter.

2. In a weighing scale, in combination, a frame, an indicator shaft mounted for rotation within the frame, a disk fixed to the indicator shaft and rotatable therewith, there being a series of indicia and a series of printing characters located adjacent each other on a marginal area of the disk, a window supported by the frame adjacent the marginal area of the disk and viewing certain of the indicia, a shutter movable along a path a portion of which path is in open position away from the window and a portion of which path is in closed position in front of the window, driving means for moving the shutter along the path from closed position into open position and from open position into closed position, the shutter normally being in open position when no load is upon the weighing scale, an arm fixed to the indicator shaft and rotatable therewith for causing a closing of the shutter after, at least, a predetermined load is placed upon the scale, printing means arranged to cooperate with the series of printing characters for taking weight recording impressions thereof, circuit means for controlling the shutter driving means, said circuit means comprising a first relay that is controlled by the position of the arm and that permits current to flow to the shutter driving means to open the shutter when the arm is in any position between no load and the predetermined load position and that cuts off current flow to the shutter driving means to close the shutter when the arm has reached or passed the predetermined load position and a second relay, and coin controlled mechanism which upon deposition of a coin permits current to flow both to the second relay and to the printing means, whereby the second relay nevertheless permits current to flow to the shutter driving means again to open the shutter and whereby a printing cycle is initiated.

3. In a weighing scale, in combination; a frame; an indicator shaft mounted for rotation within the frame; a disk fixed to the indicator shaft and rotatable therewith, there being a series of indicia on a marginal area of the disk; a window supported by the frame adjacent the marginal area of the disk and viewing certain of the indicia; a shutter movable along a path a portion of which path is in open position away from the window and a portion of which path is in closed position in front of the window; driving means for moving the shutter along the path from closed position into open position and from open position into closed position, the shutter normally being in open position when no load is upon the weighing scale; an arm fixed to the indicator shaft and rotatable therewith for causing a closing of the shutter after, at least, a predetermined load is placed upon the scale; a magnet carried on the arm; and circuit means comprising a pair of magnetic switches fixedly mounted along the path of movement of the magnet, a first relay that is controlled by the magnetic switches and the position of the magnet and that permits current to flow to the shutter driving means to open the shutter when the arm is in any position between no load and the predetermined load position and that cuts off current flow to the shutter driving means to close the shutter when the arm has reached or passed the predetermined load position, and a coin controlled second relay which upon deposition of a coin nevertheless permits current to flow to the shutter driving means again to open the shutter.

4. In a weighing scale, in combination; a frame; an indicator shaft mounted for rotation within the frame;

a disk fixed to the indicator shaft and rotatable therewith, there being a series of indicia and a series of printing characters located adjacent each other on a marginal area of the disk; a window supported by the frame adjacent the marginal area of the disk and viewing certain of the indicia; a shutter movable along a path a portion of which path is in open position away from the window and a portion of which path is in closed position in front of the window; driving means for moving the shutter along the path from closed position into open position and from open position into closed position, the shutter normally being in open position when no load is upon the weighing scale; an arm fixed to the indicator shaft and rotatable therewith for causing a closing of the shutter after, at least, a predetermined load is placed upon the scale; a magnet carried on the arm; printing means arranged to cooperate with the series of printing characters for taking weight recording impressions thereof; circuit means comprising a pair of magnetic switches fixedly mounted along the path of movement of the magnet, a first relay that is controlled by the magnetic switches and the position of the magnet and that permits current to flow to the shutter driving means to open the shutter when the arm is in any position between no load and the predetermined load position and that cuts off current flow to the shutter driving means to close the shutter when the arm has reached or passed the predetermined load position, and a second relay; and coin controlled mechanism which upon deposition of a coin permits current to flow both to the second relay and to the printing means, whereby the second relay nevertheless permits current to flow to the shutter driving means again to open the shutter and whereby a printing cycle is initiated.

References Cited in the file of this patent

UNITED STATES PATENTS

| | | |
|---|---|---|
| 364,478 | Chatillon | June 7, 1887 |
| 596,006 | Meyer | Dec. 21, 1897 |
| 675,080 | Baldwin | May 28, 1901 |
| 1,171,912 | Williams | Feb. 15, 1916 |
| 1,333,332 | Paupa | Mar. 9, 1920 |
| 1,461,949 | Sweet | July 17, 1923 |
| 1,471,181 | McConnel | Oct. 16, 1923 |
| 1,800,850 | Timson | Apr. 14, 1931 |
| 1,821,087 | Bryce | Sept. 1, 1931 |
| 2,346,121 | Weckerly | Apr. 4, 1944 |
| 2,583,461 | Arnett | Jan. 22, 1952 |